(12) United States Patent
Terada

(10) Patent No.: US 6,320,355 B1
(45) Date of Patent: *Nov. 20, 2001

(54) LOW POWER CONSUMPTION CIRCUIT AND SECONDARY BATTERY CELL PROTECTION CIRCUIT

(75) Inventor: Yukihiro Terada, Isehara (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,124

(22) Filed: Mar. 29, 2000

(51) Int. Cl.$^7$ ........................................................ H02J 7/00
(52) U.S. Cl. ................................................ 320/136; 320/134
(58) Field of Search ..................................... 320/134, 136; 361/90, 92, 115; 307/10.1, 10.7, 126, 130, 131

(56) References Cited

U.S. PATENT DOCUMENTS

| 5,783,322 | * | 7/1998 | Nagai et al. | 320/134 |
| 5,909,103 | * | 6/1999 | Williams | 320/136 |
| 5,909,104 | * | 6/1999 | Scott | 320/136 |

* cited by examiner

Primary Examiner—Peter S. Wong
Assistant Examiner—Pia Tibbits
(74) Attorney, Agent, or Firm—Ladas & Parry

(57) ABSTRACT

A low power consumption circuit has a circuit that cuts power to a portion of the low power consumption circuit under previously specified conditions in order to reduce consumption of power, a high impedance circuit that becomes high impedance when power to the portion of the low power consumption circuit is cut off, and a low current supply circuit supplying a low current to the high impedance circuit to prevent mistaken activation of the low power consumption circuit due to external interference.

6 Claims, 4 Drawing Sheets

LOW POWER CONSUMPTION CIRCUIT AND SECONDARY BATTERY CELL PROTECTION CIRCUIT

BACKGROUND OF THE INVENTION

1. Field of the Invention

The present invention relates generally to a low power consumption circuit and secondary battery cell protection circuit, and more particularly, to a low power consumption circuit and secondary battery cell protection circuit not easily susceptible to outside interference.

2. Description of the Related Art

Compared to the conventional nickel-cadmium battery cell or nickel-hydrogen battery, the light, compact lithium-ion battery that is one type of secondary battery cell delivers approximately three times as much operating voltage, approximately twice as much power per unit of weight and substantially greater power per unit of volume as well. The power, lightness and compactness of the lithium-ion battery cell has led to its widespread use in video cameras, portable telephones, PHS, notebook-type personal computers and a wide array of other portable electronic products.

However, over-discharge shortens the useful life of the lithium-ion battery cell, and moreover, the lithium-ion battery cell cannot be reused once it is completely discharged. On the other hand, continuing to charge the lithium-ion battery cell to a state of overcharge increases the cell voltage and poses a hazard, also shortening the useful life of the lithium-ion battery cell.

Therefore, in order to ensure the safety and enhance the performance of these light, compact but powerful battery cells, protection circuits are used.

FIG. 1 is a block diagram for the purpose of explaining a conventional secondary battery cell protection circuit for a secondary battery cell such as a lithium-ion battery cell. The circuit has either a charger or a load connected between +B power terminal and −B power terminal. When a charger is connected to the power terminals, the lithium-ion battery cell is charged, and when a load is connected to the power terminals, the lithium-ion battery cell is discharged.

The secondary battery cell protection circuit for a lithium-ion battery cell has a secondary battery cell protection circuit 2, a power line 5 that connects the secondary battery cell 1 and the +B power terminal, a resistor 3 connected between the power line 5 and the secondary battery cell protection circuit 2, a resistor 4 connected between the secondary battery cell protection circuit 2 and a power line 12 that is connected to the −B power terminal, discharge control field-effect transistor (hereinafter FET) FET #1 and charge control FET #2.

The secondary battery cell protection circuit 2 comprises over-discharge detection circuit 13 for detecting an over-discharge, overcharge detection circuit 14 for detecting an overcharge, overcharge control circuit 15 for applying a control signal to a terminal ⑤ and cutting off charge control FET #2 when the overcharge detection circuit 14 detects an overcharge, and an over-discharge control circuit 16 for applying a control signal to a terminal ③ and cutting off over-discharge control FET #1 when the over-discharge detection circuit 13 detects an over-discharge.

Additionally, the secondary battery cell protection circuit 2 comprises terminals ①, ②, ③, ④, ⑤. Terminal ② is a terminal for detecting an electric potential at a negative side of the secondary battery cell 1, terminal ④ is a terminal for detecting an electric potential at the power line 12 connected to the −B power terminal. The secondary battery cell protection circuit 2 is constructed so that the circuitry involved with over-discharge control and overcharge control is activated whenever the electric potential at terminal ④ is lower than the electric potential at terminal ②.

Terminal ① is a terminal for detecting an electric potential at a positive side of the secondary battery cell 1. Based on the electric potential at this terminal, the over-discharge detection circuit 13 and the overcharge detection circuit 14 carry out a determination as to the over-discharge state or overcharge state of the secondary battery cell 1. If the electric potential falls below a predetermined electric potential and the over-discharge detection circuit 13 detects an over-discharge, then the over-discharge control circuit 16 switches terminal ③ to LOW level and cuts off over-discharge control FET #1. If, on the other hand, the electric potential at terminal ① rises above a predetermined electric potential and the overcharge detection circuit 14 detects an overcharge, then the overcharge control circuit 15 switches terminal ⑤ to LOW level and cuts off overcharge control FET #2. By so doing, the secondary battery cell 1 can be protected from both excessive charge and excessive discharge.

However, consider a state in which a load is connected between the +B power terminal and the −B power terminal of the circuit shown in FIG. 1, with the secondary battery cell 1 supplying power to the load.

When the secondary battery cell 1 reaches an over-discharge state as a result of supplying power to the load for a long period of time, the electric potential at terminal ① drops and the over-discharge detection circuit 13 detects an over-discharge. When an over-discharge is detected the over-discharge control FET #1 is cut off by the over-discharge control circuit 16. At the same time, in order to prevent damage to the secondary battery cell 1, the secondary battery cell protection circuit 2 is shut off except for a portion of the secondary battery cell protection circuit 2, thus halting operation of the secondary battery cell protection circuit 2. As a result, high impedance arises at the power line 12 between the −B power terminal and the FET #1.

However, the high-impedance power line 12 is very susceptible to the effects of external noise or interference, caused, for example, by the placement of a finger on the −B power terminal or power line 12, as a result of which the electric potential at the power line 12 fluctuates. That fluctuation in the electric potential can cause the electric potential at terminal ④ to drop below the electric potential at terminal ②, activating the discharge control and charge control circuits of the secondary battery cell protection circuit 2 as a result.

The activation of the discharge control and charge control circuits of the secondary battery cell protection circuit 2 circuit that the secondary battery cell protection circuit 2 is mistakenly activated by external interference despite the operation of the secondary battery cell protection circuit 2 having been halted in order to protect the secondary battery cell 1 from damage due to over-discharge of the secondary battery cell 1.

SUMMARY OF THE INVENTION

It is an object of the present invention to provide an improved and useful low power consumption circuit and secondary battery cell protection circuit.

Another object of the present invention is to provide an improved and useful low power consumption circuit and secondary battery cell protection circuit in which, when the supply of power has been halted in order to reduce power consumption, the effects of external noise on a high impedance circuit arising as the power is cut can be eliminated.

Another object is that as the supply of power is cut to the circuit in order to reduce power consumption, a portion of the circuit becomes a high impedance circuit, and thus the effects of external interference can be eliminated.

The present invention is a low power consumption circuit comprising a circuit that cuts power to a portion of the low power consumption circuit under previously specified conditions in order to reduce consumption of power;

a high impedance circuit that becomes high impedance when power to a part of the low power consumption circuit is cut off;

a low current supply circuit supplying a low current; and an output of the low current supply circuit being supplied to the high impedance circuit so as to prevent mistaken activation of the low power consumption circuit due to external interference.

Further a device comprising, firstly, a secondary battery cell protection circuit including an over-discharge control circuit, an overcharge control circuit and a low current supply circuit, and secondly a charge control FET and a discharge control FET, each provided on a charge/discharge circuit, is referred to as a charge/discharge control device.

Other objects, features and advantages of the present invention will become apparent from the following detailed description when read in conjunction with the accompanying drawings.

BRIEF DESCRIPTION OF THE DRAWINGS

FIG. 1 is a block diagram for the purpose of describing a conventional secondary battery cell protection circuit for a secondary battery cell such as a lithium-ion battery cell and the like;

DESCRIPTION OF THE PREFERRED EMBODIMENTS

A description will now be given of preferred embodiments of the present invention, with reference to the accompanying drawings.

Figure 1:
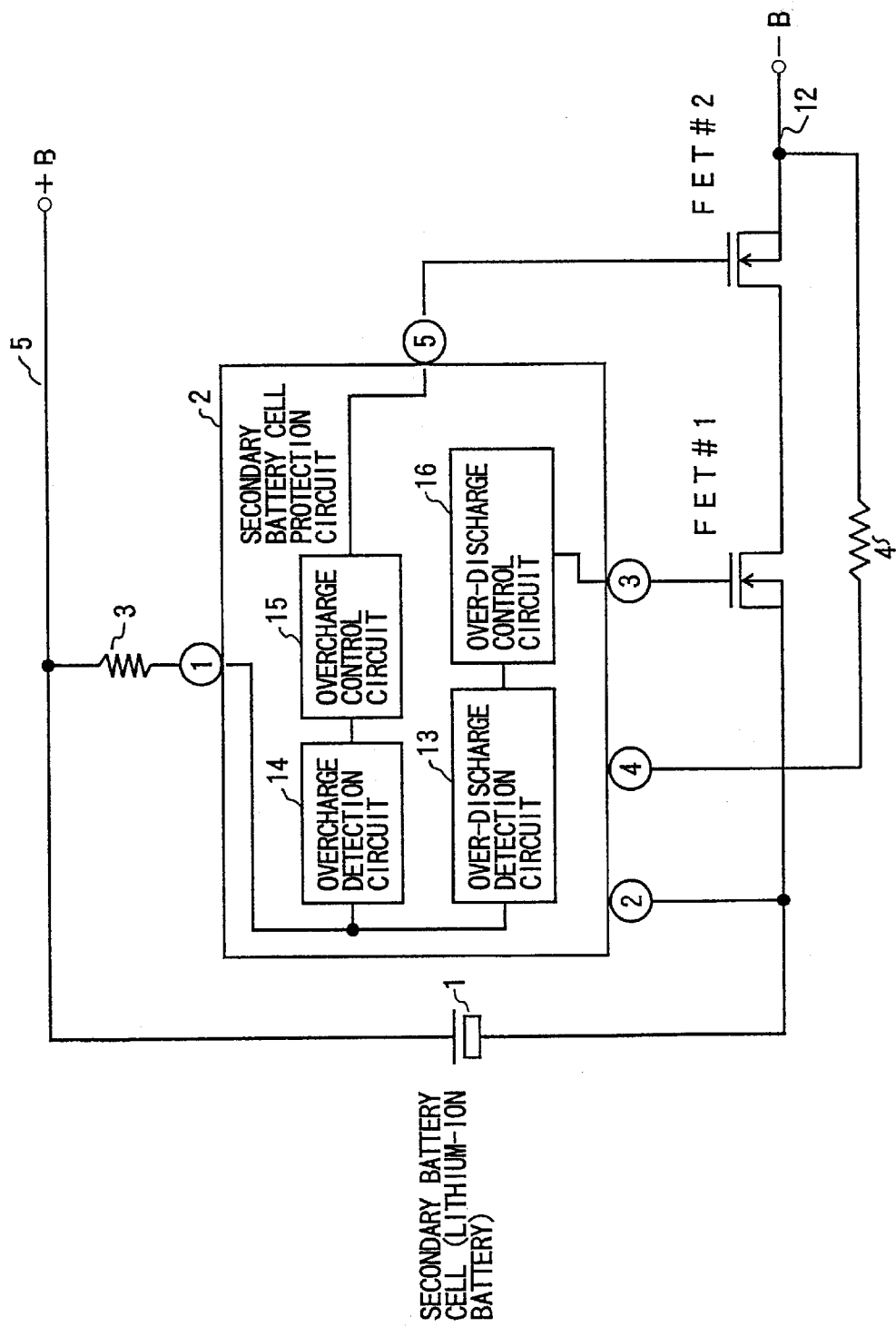
Figure 2:
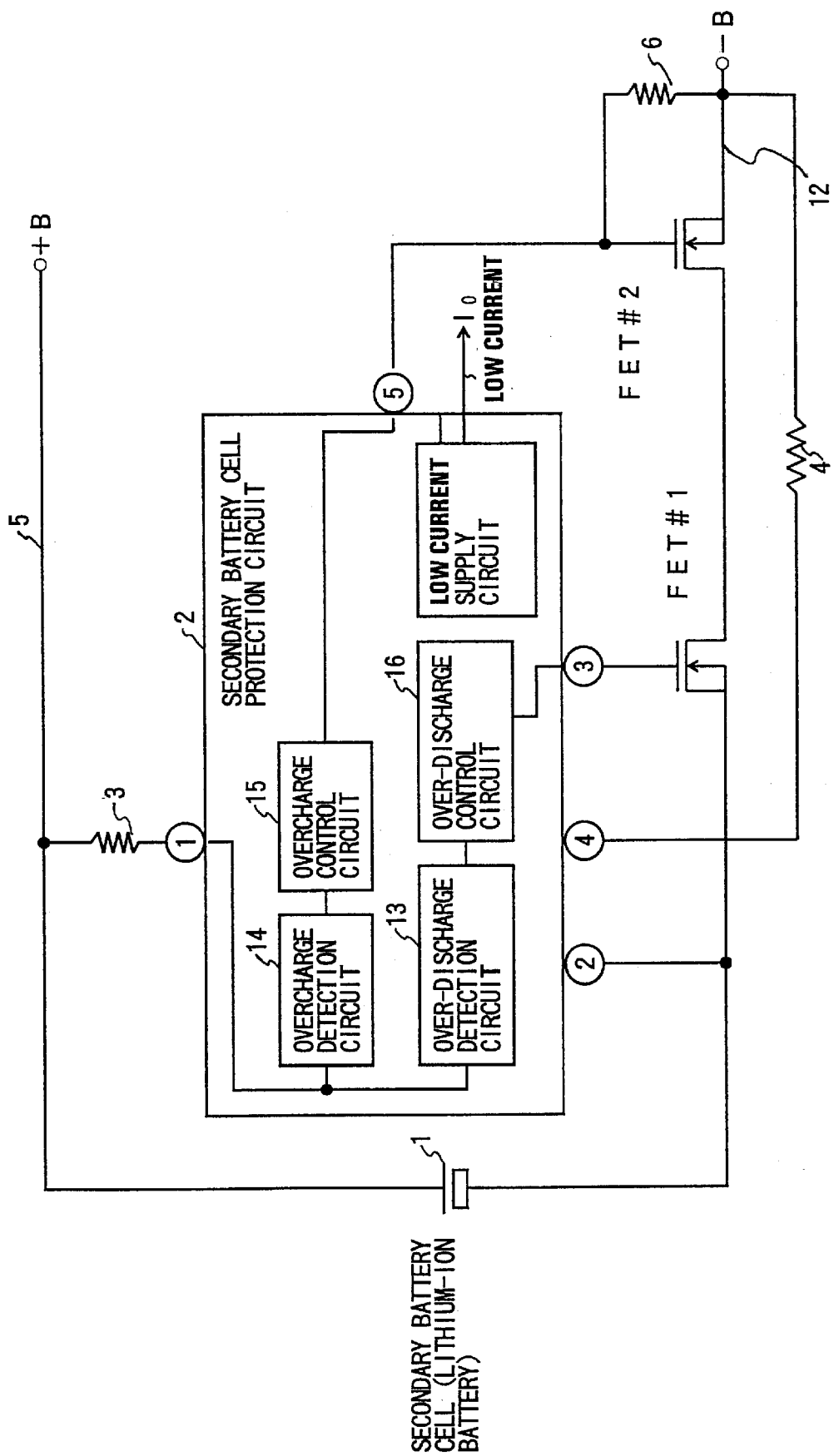
FIG. 2 is a block diagram for the purpose of describing a first embodiment of the present invention.

FIG. 2 is a block diagram for the purpose of describing a first embodiment of the present invention. It should be noted that elements in FIG. 2 that are the same as those in FIG. 1 are given the same reference numbers and a description thereof is omitted.

The secondary battery cell protection circuit 2 according to a first embodiment of the present invention as shown in FIG. 2 differs from the secondary battery cell protection circuit 2 shown in FIG. 1 in that the first embodiment includes within the secondary battery cell protection circuit 2 a low current supplying circuit 11 and a resistor 6 provided between a gate of a charge control FET #2 and a power line 12.

By giving the secondary battery cell protection circuit 2 according to the first embodiment of the present invention the structure described above, the low current $I_o$ is continuously supplied from the low current supplying circuit 11 to the power line 12 via the resistor 6. The low current $I_0$ is small and the low current supplying circuit 11 output impedance is set to be small, so the operation of the charge control FET #2 is not affected.

A description will now be given of the operation of the secondary battery cell protection circuit 2 shown in FIG. 2.

If the electric potential at terminal ① rises above a predetermined electric potential and the overcharge detection circuit 14 detects an overcharge, then the overcharge detection circuit 14 switches terminal ⑤ to LOW level and cuts off charge control FET #2, halting charging. On the other hand, if the electric potential at terminal ① drops below a predetermined electric potential and the over-discharge detection circuit 13 detects an over-discharge, then the over-discharge control circuit 16 switches terminal ③ to LOW level and cuts off FET #1, halting discharge. At the same time, in order to prevent damage to the secondary battery cell 1, the entire secondary battery cell protection circuit 2 except for the low current supplying circuit 11 is shut off, halting operation of the secondary battery cell protection circuit 2.

In the secondary battery cell protection circuit 2 according to the first embodiment of the present invention, a low current $I_o$ is supplied from the low current_supplying circuit 11 to a power line 12 via the resister 6, so impedance at the power line 12 is set to be low and thus a certain amount of external interference, for example, contact with a hand, can be tolerated without causing the electric potential to fluctuate. As a result, when operation of the secondary battery cell protection circuit 2 is halted in order to prevent damage to the secondary battery cell 1 by over-discharge of the secondary battery cell 1, external noise does not cause the electric potential at terminal ④ to fall below the electric potential at terminal ② and therefore the secondary battery cell protection circuit 2 is not mistakenly activated.

A description will now be given of a secondary battery cell protection circuit according to a second embodiment of the present invention, with reference to the accompanying drawings.

Figure 3:
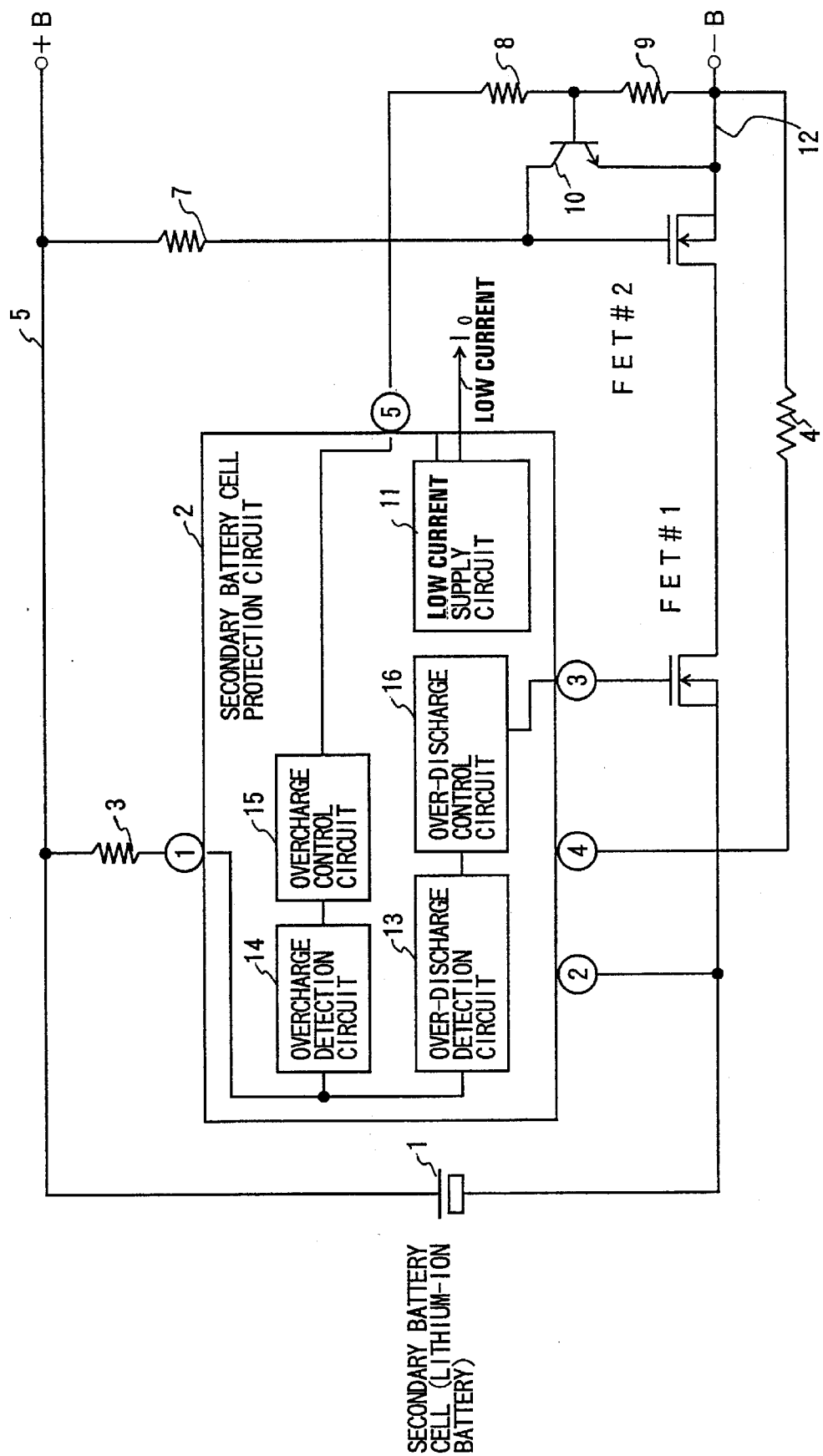
FIG. 3 is a block diagram for the purpose of describing a second embodiment of the present invention.

FIG. 3 is a block diagram for the purpose of describing a second embodiment of the present invention. It should be noted that elements in FIG. 2 that are the same as those in FIG. 1 are given the same reference numbers and a description thereof is omitted.

The secondary battery cell protection circuit 2 according to the second embodiment of the present invention as shown in FIG. 3 differs from the secondary battery cell protection circuit 2 according to the first embodiment as shown in FIG. 2 in that the second embodiment provides resistors 7, 8, 9 and switching transistor 10 at a gate circuit of charge control FET #2.

By giving the secondary battery cell protection circuit 2 according to the second embodiment of the present invention the structure described above, as with the secondary battery cell protection circuit 2 according to the first embodiment described above a low current $I_o$ is continuously supplied from low current supplying circuit 11 to power line 12, via resistors 8, 9.

A description will now be given of the operation of the secondary battery cell 1 according to the second embodiment.

If the electric potential at terminal ① rises above a predetermined electric potential and the overcharge detection circuit 14 detects an overcharge, then the secondary battery cell protection circuit 2 switches terminal ⑤ to HIGH level, as a result of which a HIGH level signal is applied to a base of switching transistor 10 and the switching transistor 10 is closed. When the switching transistor 10 is closed, a LOW level signal is applied to the gate of charge control FET #2 which up to now had been fed a HIGH signal via the resistor 7 and closed, and charge control FET #2 is cut off, halting charging as a result.

Additionally, if the electric potential at terminal ① drops below a predetermined electric potential and the over-discharge detection circuit 13 detects and over-discharge, then the secondary battery cell protection circuit 2 switches terminal ③ to LOW level and cuts off discharge control FET #1, halting discharge. At the same time, in order to prevent damage to the secondary battery cell 1, the entire secondary battery cell protection circuit 2 except for the low current supplying circuit 11 is shut off, halting operation of the secondary battery cell protection circuit 2. As a result, a high impedance arises at power line 12.

In the secondary batter cell protection circuit 2 according to the second embodiment of the present invention, a low current $I_o$ is supplied from the low current supplying circuit 11 to the power line 12 via resistors 8, 9, so impedance at the power line 12 is set to be low as with the secondary battery cell protection circuit 2 according to the first embodiment and thus the electric potential does not easily fluctuate even with a certain amount of external interference. As a result, external noise does not cause the secondary batter cell protection circuit 2 to be mistakenly activated.

Additionally, the low current $I_o$ is small and the low current supplying circuit 11 output impedance is set to be small, so the operation of the switching transistor 10 and the charge control FET #2 is not affected.

It should be noted that although the above description refers to an NPN-type transistor as the transistor 10, a PNP-type transistor may be used instead for the transistor 10.

Figure 4A:
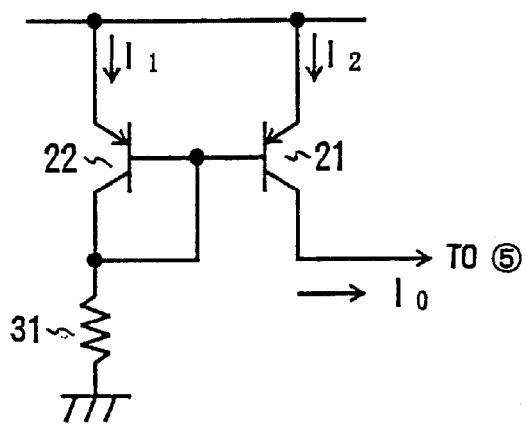
FIGS. 4A, 4B, 4C, 4D are diagrams for the purpose of describing a low current supply circuit.

FIGS. 4A, 4B, 4C, 4D are diagrams for the purpose of describing the low current supply circuit, showing specific examples thereof. FIG. 4A is a diagram showing a low current supply circuit comprising transistors 21, 22 and a resistor 31. Transistors 21, 22 form a current-mirror circuit such that a current $I_2$ flowing through transistor 21 is essentially equivalent to a current $I_1$ flowing through transistor 22 and resistor 31, with low current $I_o$ being output from terminal ⑤.

Figure 4B:
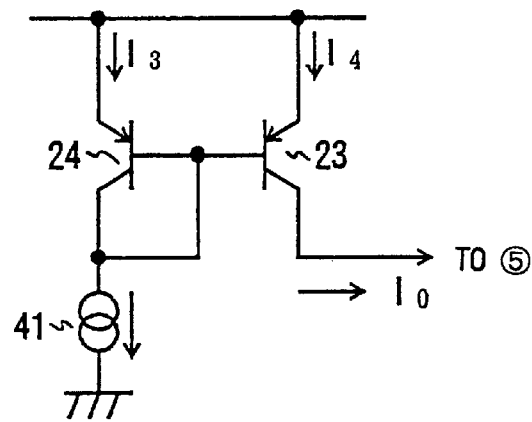

FIG. 4B shows a low current supply circuit identical to the low current supply circuit shown in FIG. 4A, except that the resistor 31 is replaced by a low current low power source 41. The operation of the low current supply circuit shown in FIG. 4B is identical to the operation of the low current supply circuit shown in FIG. 4A. A current $I_4$ flowing through transistor 23 is essentially equivalent to a current $I_3$ of low current low power source 41, with low current $I_0$ being output from terminal ⑤.

Figure 4C:
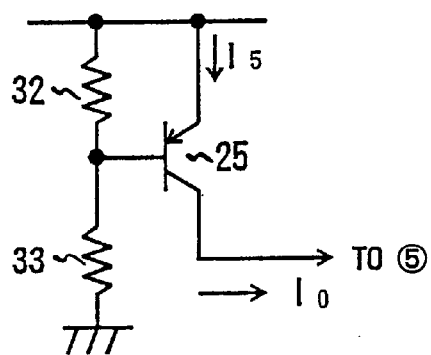

In the low current supply circuit shown in FIG. 4C, the transistor 25 base bias is determined by the ratio between the resistor 32 resistance and the resistor 33 resistance. A current 15 corresponding to the base bias flows through transistor 25, with low current $I_0$ being output from terminal ⑤.

Figure 4D:
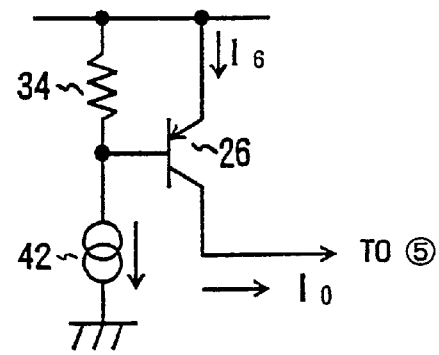

In the low current supply circuit shown in FIG. 4D, a low power source 42 is provided in place of the resistor 33 of the low current supply circuit shown in FIG. 4C. The transistor 26 base bias voltage is determined by the product of the resistor 34 resistance multiplied by the constant current 42. A current $I_6$ corresponding to the base bias voltage flows through transistor 26, with a low current $I_o$ being output from terminal ⑤.

It should be noted that although in above-described embodiments the low current supply circuit 11 continuously generates a low current, the low current supply circuit 11 may instead be made to generate a low current at required times only.

Additionally, it should be noted that although in above-described embodiments the low current supply circuit 11 is disposed inside the secondary battery cell protection circuit 2, the low current supply circuit 11 may instead be disposed outside the secondary battery cell protection circuit 2.

Additionally, it should be noted that although in above-described embodiments an N-channel MOSFET is used for the discharge control FET and the charge control FET, other types of FET, such as, for example, P-channel MOSFET, P-channel JFET, and N-channel JFET, may be used instead of an N-channel MOSFET for the discharge control FET and the charge control FET.

Additionally, It should be noted that the present invention can be adapted for secondary battery cells other than lithium-ion battery cells, such as a nickel-cadmium battery cell or nickel-hydrogen battery.

Additionally, the present invention is not limited to a secondary battery cell protection circuit but can be adapted for any circuit for which reduced power consumption is required. That is, the present invention can be used for any circuit that shuts down in order to reduce power consumption and as a result of shutting down creates a high impedance circuit, the high impedance circuit being susceptible to external interference that mistakenly activates the circuit.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the invention.

The present application is based on Japanese Priority Application No. 10-280344, filed on Oct. 1, 1998, the entire contents of which are hereby incorporated by reference.

What is claimed is:

1. A low power consumption circuit comprising:
   a circuit that cuts power to a portion of the low power consumption circuit under an over-discharge condition in order to reduce consumption of power;
   a high impedance circuit that becomes high impedance when power to the portion of the low power consumption circuit is cut off; and
   a low current supply circuit supplying a low current to the high impedance circuit so as to prevent mistaken activation of the low power consumption circuit due to external interference.

2. A secondary battery cell protection circuit comprising:
   an over-discharge detection circuit detecting an over-discharge of the secondary battery cell;
   a discharge control circuit controlling a discharge of a secondary battery cell depending on a voltage of the secondary battery cell, the discharge control circuit connected to the over-discharge detection circuit; and
   a low current supply circuit supplying a low current wherein the low current supply circuit is provided within the secondary battery cell protection circuit;
   wherein the secondary battery cell protection circuit cuts power to a part or all of the secondary battery cell protection circuit when the over-discharge detection circuit detects an over-discharge of the secondary battery cell and supplies the low current from the low current supply circuit to a power line at which a high impedance circuit has been formed because the power supply is cut off.

3. The secondary battery cell protection circuit as claimed in claim 2, wherein:

the low current supply circuit is provided within the secondary battery cell protection circuit; and wherein power to at least a part of the secondary battery cell protection circuit other than the low current supply circuit is cut when the over-discharge detection circuit detects an over-discharge of the secondary battery cell.

4. The secondary battery cell protection circuit as claimed in claim 2, wherein the over-discharge detection circuit is provided within the secondary battery cell protection circuit.

5. A charge/discharge control device comprising:

a secondary battery cell protection circuit including an over-discharge control circuit, an overcharge control circuit and a low current supply circuit;

a charge control FET and a discharge control FET, each provided on a charge/discharge circuit; and a resistor connected between a gate of the charge control FET and the charge/discharge circuit;

wherein when an over-discharge occurs, the charge/discharge control device applies an output of the over-discharge control circuit to the over-discharge control FET and supplies a low current from the low current supply circuit to the resistor.

6. A charge/discharge control device comprising:

a secondary battery cell protection circuit comprising an over-discharge control circuit, an overcharge control circuit and a low current supply circuit;

a charge control FET and a discharge control FET, each provided on a charge/discharge circuit;

a switching transistor connected between the charge control FET gate and the charge/discharge circuit; and a resistor connected between the switching transistor base and the charge/discharge circuit and overcharge control circuit output terminal, wherein, when an over-discharge occurs, the charge/discharge control device applies an output of the over-discharge control circuit to the over-discharge control FET and supplies a low current from the low current supplies circuit to the switching transistor base.

* * * * *